United States Patent
Brooks

(10) Patent No.: US 10,542,324 B2
(45) Date of Patent: Jan. 21, 2020

(54) APPARATUS AND METHOD FOR INCREASING UPSTREAM CAPACITY IN A BROADBAND COMMUNICATIONS SYSTEM

(71) Applicant: TIME WARNER CABLE ENTERPRISES LLC, St. Louis, MO (US)

(72) Inventor: Paul D. Brooks, Weddington, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 15/427,610

(22) Filed: Feb. 8, 2017

(65) Prior Publication Data

US 2017/0214978 A1    Jul. 27, 2017

Related U.S. Application Data

(63) Continuation of application No. 12/789,961, filed on May 28, 2010.

(Continued)

(51) Int. Cl.
*H04L 5/14* (2006.01)
*H04N 21/61* (2011.01)
(Continued)

(52) U.S. Cl.
CPC ..... *H04N 21/6168* (2013.01); *H04L 12/2801* (2013.01); *H04N 21/44* (2013.01);
(Continued)

(58) Field of Classification Search
None
See application file for complete search history.

(56) References Cited

U.S. PATENT DOCUMENTS 3,639,840 A * 2/1972 Shekel ................. H03B 5/1203
725/151
4,717,970 A * 1/1988 Long ....................... H04N 7/16
348/731

(Continued)

OTHER PUBLICATIONS

Wikipedia, Multimedia over Coax Alliance, downloaded from http://en.wikipedia.org/wiki/Multimedia_over_Coax_Alliance on Sep. 9, 2010. pp. 1-3.

(Continued)

*Primary Examiner* — Christopher T Wyllie
(74) *Attorney, Agent, or Firm* — Otterstedt, Wallace & Kammer, LLP

(57) ABSTRACT

A method for providing enhanced broadband services over a communications network includes the steps of: receiving from the communications network at least first signals in a first frequency band, the first signals comprising programming material that has been converted from a second frequency band and/or material originally generated in the first frequency band to be converted to the second frequency band, the first and second frequency bands being non-overlapping; translating one or more first signals from the first frequency band to the second frequency band; and combining the one or more first signals translated to the second frequency band with the first signals in the first frequency band to generate combined programming material comprising one or more signals in the first frequency band and one or more signals in the second frequency band for reception by receiving location equipment.

15 Claims, 7 Drawing Sheets

Related U.S. Application Data

(60) Provisional application No. 61/324,458, filed on Apr. 15, 2010.

(51) Int. Cl.

| | | |
|---|---|---|
| *H04L 12/28* | (2006.01) | |
| *H04N 21/44* | (2011.01) | |
| *H04L 5/06* | (2006.01) | |
| *H04L 5/08* | (2006.01) | |
| *H04N 7/173* | (2011.01) | |
| *H04N 5/44* | (2011.01) | |
| *H01P 1/213* | (2006.01) | |

(52) U.S. Cl.
CPC ............... *H01P 1/213* (2013.01); *H04L 5/06* (2013.01); *H04L 5/08* (2013.01); *H04N 5/4401* (2013.01); *H04N 7/17309* (2013.01)

(56) References Cited

U.S. PATENT DOCUMENTS

| | | | | |
|---|---|---|---|---|
| 5,432,838 A * | 7/1995 | Purchase | ............. | H04B 5/0018 455/523 |
| 5,610,916 A * | 3/1997 | Kostreski | ............. | H04H 20/18 348/E5.002 |
| 5,963,557 A * | 10/1999 | Eng | ............. | H04H 20/42 370/432 |
| 9,860,591 B2 * | 1/2018 | Wells | ............. | H04L 12/2801 |
| 2002/0069417 A1 * | 6/2002 | Kliger | ............. | H04L 12/2803 725/78 |
| 2003/0056217 A1 * | 3/2003 | Brooks | ............. | H04N 7/106 725/46 |
| 2003/0066082 A1 * | 4/2003 | Kliger | ............. | H04L 12/2801 725/80 |
| 2004/0060072 A1 * | 3/2004 | Klein | ............. | H04N 7/106 725/127 |
| 2004/0068747 A1 * | 4/2004 | Robertson | ............. | H04L 12/2838 725/98 |
| 2004/0268402 A1 * | 12/2004 | Bugajski | ............. | H04L 12/2801 725/111 |
| 2005/0125841 A1 * | 6/2005 | Helms | ............. | H04N 7/17336 725/118 |
| 2005/0155082 A1 * | 7/2005 | Weinstein | ............. | H04H 20/46 725/131 |
| 2007/0022458 A1 * | 1/2007 | Son | ............. | H04N 7/17318 725/112 |
| 2007/0189770 A1 * | 8/2007 | Sucharczuk | ............. | H04H 20/76 398/66 |
| 2008/0046947 A1 * | 2/2008 | Katznelson | ............. | H04N 7/173 725/114 |
| 2008/0175212 A1 * | 7/2008 | Angell | ............. | H04W 88/085 370/338 |
| 2008/0225687 A1 * | 9/2008 | Oksman | ............. | H04L 41/0893 370/201 |
| 2009/0165070 A1 * | 6/2009 | McMullin | ............. | H04B 1/10 725/125 |
| 2010/0162340 A1 * | 6/2010 | Riggsby | ............. | H04B 3/04 725/127 |
| 2011/0255452 A1 | 10/2011 | Brooks | | |
| 2013/0332978 A1 * | 12/2013 | Rakib | ............. | H04N 21/6168 725/127 |

OTHER PUBLICATIONS

Kari Stadius, Arto Malinen, Petri Jarvio, Petteri Paatsila and Kari Halonen—A Broadband Double-Conversion RF Tuner. Analog Integrated Circuits and Signal Processing, 43, 2005. pp. 15-30.

* cited by examiner

100

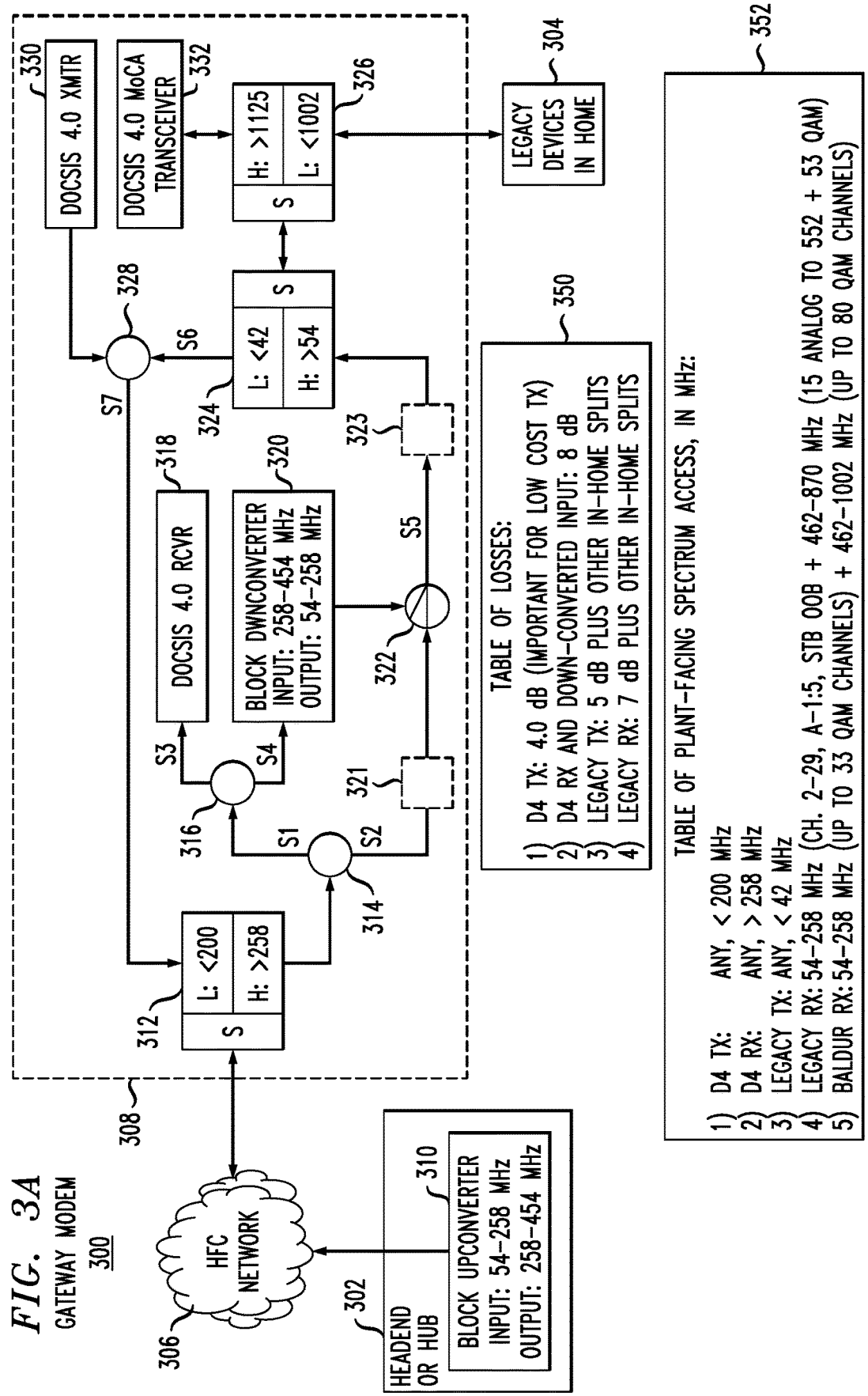

GATEWAY DOWN-CONVERTER
300

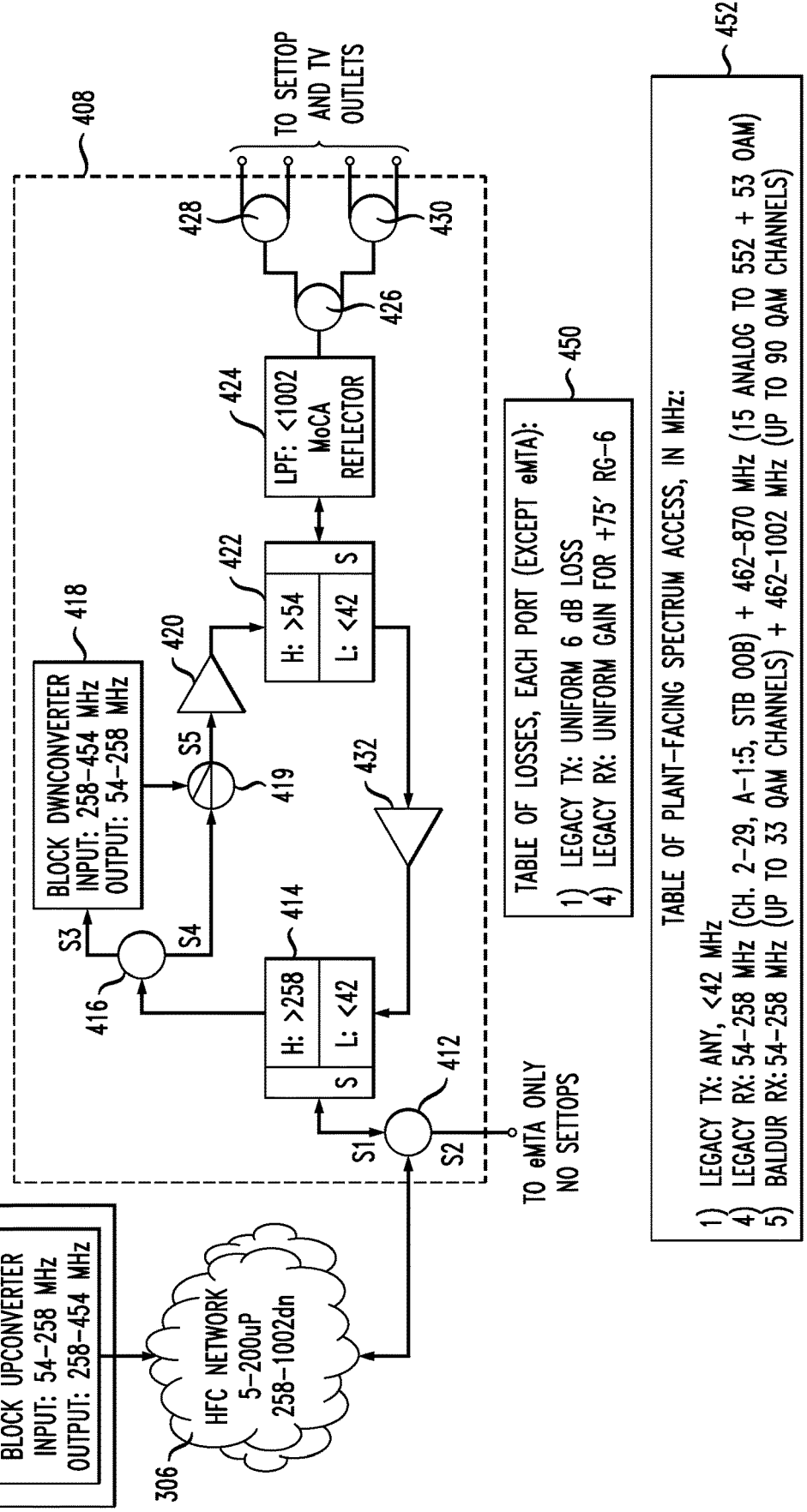

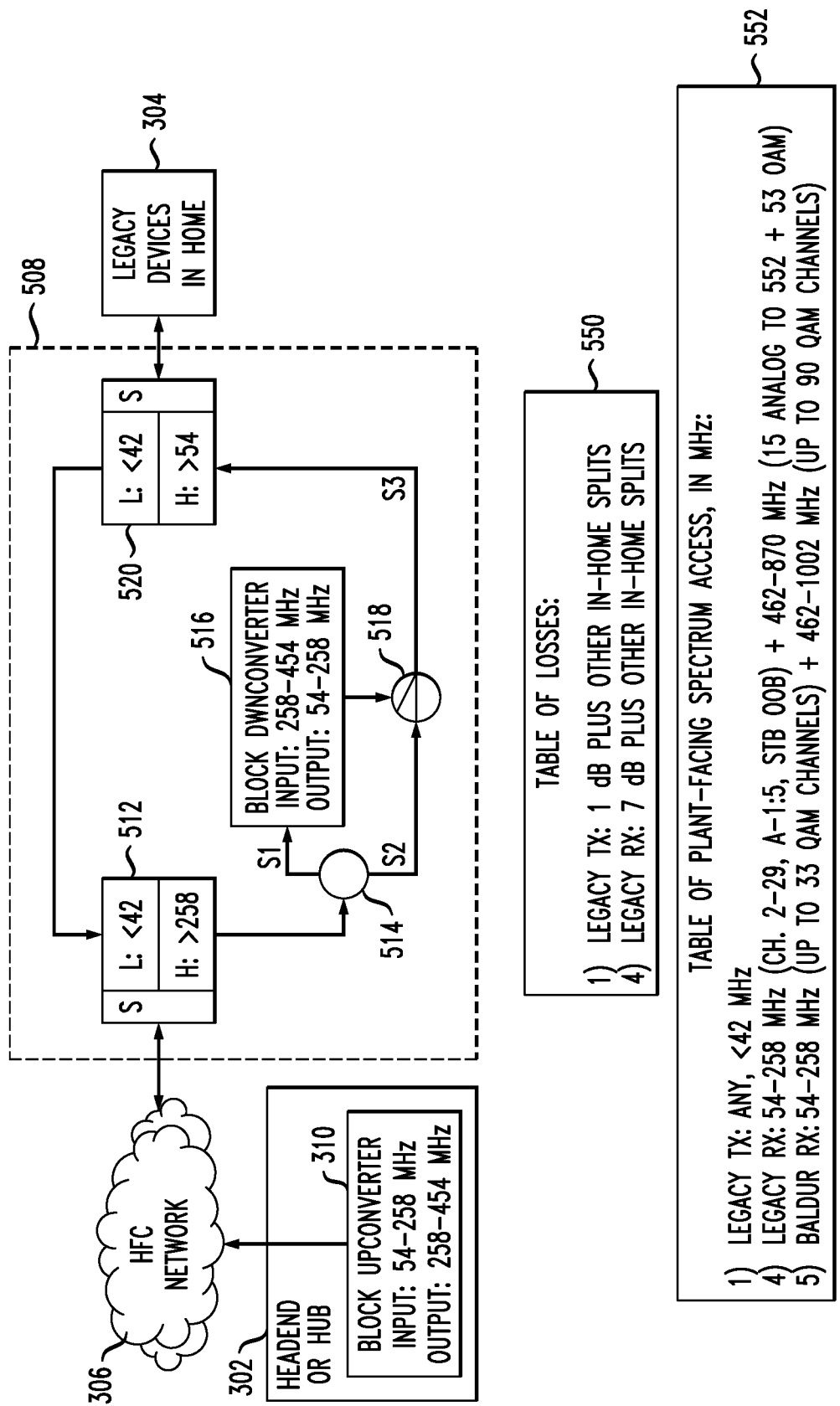

APPARATUS AND METHOD FOR INCREASING UPSTREAM CAPACITY IN A BROADBAND COMMUNICATIONS SYSTEM

CROSS-REFERENCE TO RELATED APPLICATION(S)

This application is a continuation of U.S. patent application Ser. No. 12/789,961 filed May 28, 2010 entitled APPARATUS AND METHOD FOR INCREASING UPSTREAM CAPACITY IN A BROADBAND COMMUNICATIONS SYSTEM, the complete disclosure of which is expressly incorporated herein by reference in its entirety for all purposes, which in turn claims the benefit of U.S. provisional application Ser. No. 61/324,458, filed on Apr. 15, 2010, the complete disclosure of which is also expressly incorporated herein by reference in its entirety for all purposes.

FIELD OF THE INVENTION

The present invention relates generally to the electrical, electronic, and computer arts, and more particularly relates to delivery of programming content and services to subscribers via a communications network.

BACKGROUND OF THE INVENTION

In existing cable systems, it is desirable for cable service providers to supply not only broadcast programming content but also to supply secondary broadband data services to subscribers. Such broadband data services may be used, for example, to provide Internet access, streaming video, Voice over Internet Protocol (VoIP) telephony, etc., to subscribers.

With the continual push to extend data communications capacity and features of broadband services, there are significant modifications to the existing infrastructure that are required in order to support such extended data communications capacity and features, including, but not limited to, replacing existing copper wiring with optical fiber cable, replacing headend communications equipment capable of operating at enhanced data rates or in extended frequency spectrums, and retrofitting customer premises equipment (e.g., set-top boxes or set-top terminals) for supporting the enhanced broadband services. Unfortunately, the modifications to the existing broadband service that are required to deliver such enhanced features and/or broadband capacity are often disruptive to subscribers and are generally cost-prohibitive to the service provider.

SUMMARY OF THE INVENTION

Techniques are provided for facilitating ultra high-speed broadband service (e.g., 1 gigabits per second (Gbps) upstream capacity or higher) using existing hybrid fiber-coax (HFC) network wiring while providing backwards compatibility with legacy customer premises equipment (CPE) in operative communication with the network. In this manner, embodiments of the invention provide a cost-effective solution for migrating subscribers to the enhanced broadband service without disrupting service to legacy subscribers who do not desire such enhanced services. To accomplish this objective, embodiments of the invention preferably include a gateway apparatus couplable between the HFC network and CPE which is operative to receive downstream signals in an enhanced frequency spectrum high enough to support a prescribed upstream capacity, and yet maintain legacy service functionality.

In accordance with one embodiment of the invention, a method for providing enhanced broadband services over a communications network includes the steps of: receiving from the communications network at least first signals in a first frequency band, the first signals comprising programming material that has been converted from a second frequency band and/or material originally generated in the first frequency band to be converted to the second frequency band, the first and second frequency bands being non-overlapping; translating one or more first signals from the first frequency band to the second frequency band; and combining the one or more first signals translated to the second frequency band with the first signals in the first frequency band to generate combined programming material comprising one or more signals in the first frequency band and one or more signals in the second frequency band for reception by receiving location equipment.

In accordance with another embodiment of the invention, an apparatus for interfacing between one or more customer premises devices and a communications network includes an interface couplable to the communications network and operative to receive at least first signals in a first frequency band, the first signals including programming material that has been converted from a second frequency band and/or material originally generated in the first frequency band to be converted to the second frequency band. The first and second frequency bands are non-overlapping. The apparatus further includes a frequency converter coupled to the interface and operative to translate one or more first signals from the first frequency band to the second frequency band. A combiner in the apparatus is coupled to the frequency converter and to the interface. The combiner is operative to combine the one or more first signals translated to the second frequency band with the first signals in the first frequency band to generate combined programming material including one or more signals in the first frequency band and one or more signals in the second frequency band for reception by customer premises devices.

In accordance with yet another embodiment of the invention, a gateway apparatus is provided for interfacing between a broadband communications network and at least one customer premises device. The gateway apparatus is operative: (i) to receive downstream signals in an enhanced frequency spectrum high enough to support a prescribed upstream data capacity; and (ii) to restore upstream out-of-band functionality between the at least one customer premises device and the broadband communications network.

One or more embodiments of the invention, or elements thereof, can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate similar elements throughout the several views, and wherein:

FIG. 3A is a block diagram depicting at least a portion of an exemplary broadband communications system including a gateway apparatus, according to an embodiment of the present invention;

FIG. 4 is a block diagram depicting an exemplary broadband communications system including a gateway apparatus with integrated amplifier, according to an embodiment of the present invention;

FIG. 5 is a block diagram depicting an exemplary broadband communications system including a simplified gateway apparatus, according to an embodiment of the present invention.

DETAILED DESCRIPTION OF PREFERRED EMBODIMENTS

Principles of the present invention will be described herein in the context of illustrative embodiments of a gateway model architecture suitable for use, for example, in a hybrid fiber-coax (HFC) network, or other communications system. It is to be appreciated, however, that the invention is not limited to the specific apparatus and methods illustratively shown and described herein. Furthermore, while aspects of the present invention are particularly well-suited for use in conjunction with data-over-cable service interface specification (DOCSIS) and Digital Audio Visual Council (DAVIC) communications protocols, the invention is not limited to use with such protocols, or to any other standard or non-standard communications schemes. Rather, aspects of the invention are directed broadly to a cost-effective solution for beneficially providing enhanced broadband data communications over an existing broadband network, while advantageously providing compatibility with legacy customer premises equipment (CPE), or alternative receiving location equipment, such as, for example, set-top boxes (STBs) or set-top terminals (STTs). In this manner, aspects of the invention facilitate ultra high-speed broadband service (e.g., 1 Gbps upstream capacity or higher) using existing HFC network wiring while providing backwards compatibility with legacy CPE in operative communication with the network.

It will become apparent to those skilled in the art given the teachings herein that numerous modifications can be made to the embodiments shown that are within the scope of the present invention. That is, no limitations with respect to the specific embodiments described herein are intended or should be inferred.

In a standard cable television (CATV) system, programming material corresponding to various program channels, regardless of the format (e.g., analog or digital), is generally transmitted over a multi-channel delivery network (e.g., CATV network) including one or more transmission channels. The term "transmission channel" as used herein is intended to refer broadly to a designated frequency band through which a transport stream comprising program material and/or data is conveyed. In one embodiment, a transmission channel may comprise, for example, a 6 Megahertz (MHz) frequency band, although the invention is not limited to any specific frequency band. The term "program channel" as used herein is intended to refer broadly to the source of programming material or the service for use by a consumer (e.g., CATV subscriber).

Programming material may be transmitted in various formats, including, for example, analog program channel material, digital program channel material, video-on-demand (VOD) services, etc. In order to accommodate these formats, a designated broadcast frequency spectrum is divided into various allocated frequency bands, each frequency band corresponding to a given programming material format.

Figure 1:
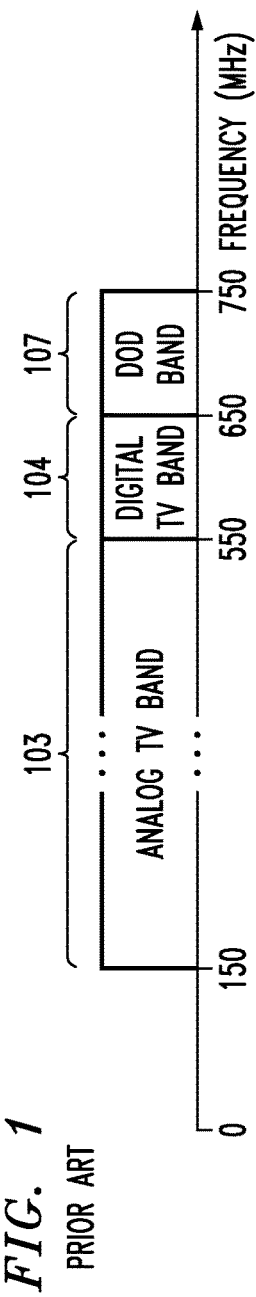
FIG. 1 depicts an illustrative allocation of frequency bands in a frequency spectrum from 150 MHz to 750 MHz for transmission of various identified types of programming material in a conventional broadcast cable television system.

FIG. 1 depicts an illustrative allocation of frequency bands in a frequency spectrum from 150 MHz to 750 MHz for transmission of various identified types of programming material in a conventional broadcast cable television system. Analog program channel material may be allocated to a first portion of the frequency band, which may be an analog TV band 103, ranging from about 50 MHz to about 550 MHz, digital program channel material may be allocated to a second portion of the frequency band, which may be a digital TV band 104, ranging from about 550 MHz to about 650 MHz, and VOD program material may be allocated to a third portion of the frequency band, which may be a digital on-demand (DOD) band 107, ranging from about 650 MHz to about 750 MHz. Out-of-band (OOB) data communications, including, for example, control signaling, may be allocated to yet another portion of the frequency band.

Figure 2:
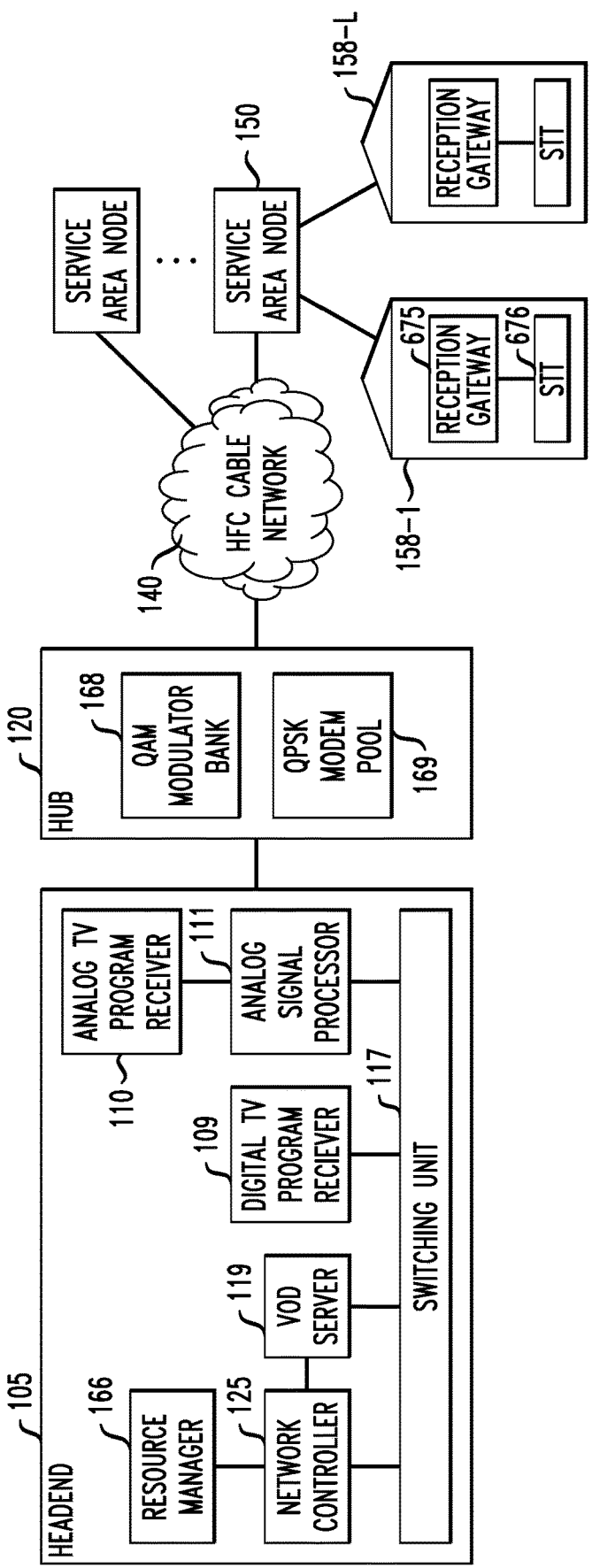
FIG. 2 is a block diagram depicting an illustrative broadband communications system in which principles of the present invention may be embodied.

FIG. 2 is a block diagram depicting an illustrative broadband communications system 100, e.g., a cable TV system, in which principles of the invention may be embodied. The system 100 includes a headend 105 operative to receive, among other things, programming materials attributed to various program channels, and provides TV broadcast and other services, e.g., VOD services, to users at different user locations, including user locations 158-1 through 158-L, which may be referred to collectively as 158, connected to the same service area node 150, where L represents an integer greater than one. Although only one service area node 150 is shown, system 100 may include a plurality of service area nodes, with each service area node functioning as an interface between corresponding user locations coupled thereto (e.g., 150-1, 158-L) and HFC network 140. Each user location (e.g., 158-1) preferably includes a reception gateway 675 connected to one or more STTs or STBs. A television or other display device is preferably connected to the STT for display of selected programming material.

For example, user location 158-1, which may be a home, includes gateway 675 which may be installed inside or outside the home, and is connected to STT 676.

The programming materials are delivered from headend 105 to user locations 158 through "in-band" transmission channels provided by HFC cable network 140. In accordance with the DOCSIS, these transmission channels provided by the HFC network may comprise 6 MHz channels (US) or 8-MHz channels (Europe) located in the 47-862 MHz band allocated for downstream communications of the programming materials from headend 105 to user locations 158-1 to 158-L. Quadrature amplitude modulation (QAM) modulator bank 168 in hub 120 preferably modulates the downstream communications onto selected in-band transmission channels in accordance with a well known QAM scheme.

In addition to the in-band channels, data may be communicated downstream from headend 105 to user locations 158 via one or more forward data channels (FDCs). FDCs, sometimes referred to as "out-of-band" (OOB) channels, are often employed to transport control signaling data and/or other data, e.g., system messages, etc., to user locations 158. In one embodiment, the FDCs may populate the 54-130 MHz band of a coaxial cable. Quadrature phase-shift keying (QPSK) modem pool 169 in hub 120 modulates downstream data onto selected FDCs in accordance with a well known QPSK scheme.

Data may be transmitted upstream from user locations 158 to headend 105 via one or more reverse data channels (RDCs), which populate a reverse passband, e.g., 5-40 MHz band, of a coaxial cable. Data conveyed by the RDCs is modulated in accordance with the QPSK scheme. QPSK modem pool 169 receives the QPSK signals in the RDCs and performs any necessary demodulation before transmitting the signals to headend 105.

An STT 676 at a user location 158-1 may utilize an RDC for sending data including, e.g., user data, messages, etc., to headend 105. Using a contention-based access mechanism established by the DAVIC, a standard setting organization, each STT can share an RDC with other STTs in the network. This mechanism enables an STT to transmit upstream messages without a dedicated connection to a QPSK demodulator. As also specified by DAVIC, for communications purposes, a network controller 125 in the headend 105, and STTs 676, are preferably individually identified by unique Internet protocol (IP) addresses assigned thereto. In this instance, e.g., STT 676 and gateway 675 may each be identified by an IP address.

In this illustration, headend 105 includes a digital TV program receiver 109, an analog TV program receiver 110, an analog signal processor 111, a VOD server 119, network controller 125, a switching unit 117, and a resource manager 166. In a conventional manner, digital TV program receiver 109 receives TV programming material in digital format (e.g., an MPEG-2 format) from one or more digital program channel sources. Receiver 109 then provides to switching unit 117 the digital TV program streams, which may have been multiplexed to form one or more digital TV transport streams. Each transport stream may be identified by a unique transport stream identification (TSID). Each TV program stream within a transport stream may be identified by a program stream ID (PID) or other identifier.

Analog TV program receiver 110 receives, in a conventional manner, traditional analog TV programming material from one or more analog program channel sources. For example, programming material from sixty analog program channels may require about 400 MHz bandwidth to convey same. To that end, the received analog programming material is fed to analog signal processor 111 wherein an analog-to-digital (A/D) converter (not explicitly shown) digitizes the analog material in a conventional manner. The digitized analog TV programming material is encoded using a MPEG-2 encoder (not explicitly shown), or other encoding means, to effect data-compression thereof. The resulting MPEG-2 program streams containing the analog material may be encrypted in accordance with a conventional data encryption scheme to secure the programming content. The output of analog signal processor 111, which may be referred to as "digitized analog TV transport streams," is fed to switching unit 117.

VOD server 119, under the control of network controller 125, generates digital program streams containing programming material requested by users, e.g., movies requested through a VOD service. In one embodiment, VOD server 119 may generate transport streams, each comprising one or more program streams. The transport streams generated by VOD server 119, hereinafter referred to as "VOD transport streams," are fed to switching unit 117. Network controller 125, among other functions, preferably receives requests from users for VOD services and, in response, causes VOD server 119 to generate one or more VOD transport streams containing the requested programming material.

Under the control of network controller 125, the transport streams from digital TV program receiver 109, analog signal processor 111, and VOD server 119 are switched by switching unit 117 to selected modulators in QAM modulator bank 168 in hub 120. The selected modulators modulate the respective transport streams onto various in-band transmission channels, e.g., according to a prescribed frequency band allocation. For example, with reference again to FIG. 1, DOD band 107 ranging from 650 MHz to 750 MHz may be allocated for the transmission of VOD transport streams, and digital TV band 104 ranging from 550 MHz to 650 MHz may be allocated for transmission of digital TV transport streams. However, because of the above-described processing by analog signal processor 111, the digitized analog TV transport streams require only a narrow portion of the analog TV band 103 ranging from, for example, 150 MHz to 190 MHz, as opposed to the entire analog TV band ranging from 150 MHz to 550 MHz, for transmission of the same amount of analog TV programming material.

Resource manager 166 may be operative to assign an unused transmission channel within band 107 for transmitting the aforementioned VOD transport stream, especially when no transmission channels in band 103 are available. Manager 166 informs network controller 125 of such an assignment. Network controller 125 directs switching unit 117 to switch the VOD transport stream to the proper modulator in QAM modulator bank 168 to modulate the VOD transport stream onto the assigned transmission channel.

With an ever-increasing number of program channels and use of on-demand services (e.g., movies-on-demand and subscription VOD services), there is a continual push for additional bandwidth to deliver such programming material and other services. Aspects of the invention are directed to more effectively utilizing the limited network bandwidth for providing enhanced broadband programming and services, including 1 Gigabits per second (Gbps) symmetrical broadband service (i.e., 1 Gbps upstream and downstream). Existing HFC networks do not have adequate upstream capacity to provide such service.

Possible solutions to increasing the upstream capacity of an existing HFC network include, but are not limited to, replacing the traditional copper wire with optical fiber, allocating additional spectral space in the passband, and extending the passband to place new upstream service above the current spectrum. These proposed solutions are, however, either prohibitively expensive, too complex, or would require extensive retrofitting, and are therefore undesirable.

DOCSIS 1.x and 2.0 specifications support an upstream frequency range of 5 MHz to 42 MHz (65 MHz for Euro-DOCSIS) and a downstream frequency range from 88 MHz to 860 MHz. (See, e.g., "Data-Over-Cable Service Interface Specifications, DOCSIS 2.0, Radio Frequency Interface Specification," CM-SP-RFIv2.0-C02-090422, Apr. 22, 2009, the disclosure of which is incorporated by reference herein in its entirety for all purposes). The DOCSIS 3.0 specification, extends the upstream frequency range from 5 MHz to 85 MHz and the downstream frequency range from 108 MHz to 1002 MHz. (See, e.g., "Data-Over-Cable Service Interface Specifications, DOCSIS 3.0, Physical Layer Specification," CM-SP-PHYv3.0-I08-090121, pp. 20-21, Jan. 21, 2009, the disclosure of which is incorporated by reference herein in its entirety for all purposes).

The band of frequencies between the maximum upstream range and the minimum downstream range may be referred to as the "diplexer crossover," "crossover band," "crossover region," or "crossover point;" these terms may be used interchangeably herein. Raising the crossover point is beneficial for future spectrum re-allocation and avoiding known bad frequencies on the upstream. In implementing this proposed shift in the crossover point (e.g., from 42/54 MHz to 85/108 MHz), a possibility for customer premises equipment (CPE) overload may occur; specifically, there is a concern as to whether or not current CPE such as STBs and TV sets can handle a potentially high level of "noise" generated by a modem operating at 40 MHz or higher. For example, a National Television System Committee (NTSC) TV set intermediate frequency (IF) is about 41-47 MHz, and upstream signals in this range may cause interference with TVs and VCRs connected directly to the cable. Furthermore, in order to accommodate this shift in the crossover point, one or more components in the forward or reverse signal paths, such as, for example, diplex filters, may require replacement.

The term "forward signal path" as used herein is intended to refer to the direction of radio frequency (RF) signal flow away from the headend toward the end user (i.e., downstream). Likewise, the term "reverse signal path" as used herein is intended to refer to the direction of RF signal flow toward the headend away from the end user (i.e., upstream).

A diplex filter essentially allows the forward signal path and the reverse signal path to use the same coaxial cable without interference. Typically, one diplex filter is used on the input of a forward signal amplifier and output of a reverse signal amplifier and another diplex filter is used on the output of the forward signal amplifier and input of the reverse signal amplifier. A diplex filter is a three-port passive device comprising a high pass filter and a low pass filter joined at a common port. In this arrangement, the diplex filters are used with the distribution amplifier and reverse signal amplifier to separate the forward traveling high frequency broadband television channels and the reverse traveling low frequency data or monitoring channels.

Legacy STBs are operative to receive certain channels such as, for example, program guides—so-called "forward control (DAVIC) carrier." However, these legacy STBs are only capable of receiving that carrier up to about 130 MHz. Hence, moving the crossover point to 85/105 MHz (as in the case of DOCSIS 3.0) would still enable legacy STBs to receive the aforementioned forward control carrier. Unfortunately, however, the maximum upstream frequency range of 85 MHz is insufficient to achieve a desired 1 Gbps upstream capacity. Consequently, a substantially higher frequency crossover point is required. For example, one way to achieve a 1 Gbps upstream capacity is to extend the maximum upstream frequency range to 200 MHz and the minimum downstream frequency range to 258 MHz, so that the new crossover region lies between 200 MHz and 258 MHz (i.e., a 200/258 MHz split). By utilizing this approach, legacy STBs would no longer be able to receive the forward control carrier, and thus the 200/258 MHz split would render legacy STBs obsolete. Moreover, replacing or retrofitting all STBs would involve a significant capital investment and would therefore be undesirable.

One possible solution for restoring the capability of legacy STBs to receive the forward control carrier would be to demodulate the forward control carrier and to translate the information conveyed therein to a higher frequency carrier. This can be accomplished in the home (end user), such as by the STB, assuming the STB is capable of receiving the demodulated signal. At the CPE, a separate device would be placed in front of the STB (e.g., between the STB and the HFC network) that demodulates the information from the higher frequency carrier and remodulates it on a channel that the legacy STB is operative to receive. This solution, however, is relatively complex and has its own costs associated therewith. It is to be understood, however, that according to other embodiments it is not necessary to demodulate the forward control carrier signal.

Another problem with the 200/258 MHz split migration is the loss of low-frequency analog channels; for example, channels 2 through 29. Although the programming conveyed on these channels can be duplicated and shifted to higher channels, for example, channels 30 through 64, respectively, in nodes ready to upgrade, there is substantial desirability that these channels remain at their original allocations.

The present invention, in one or more embodiments thereof, overcomes disadvantages of the aforementioned approaches by providing an enhanced broadband communications system (e.g., ultra high speed data service, Internet Protocol television (IPTV) service, etc.) that is fully compatible with legacy CPE. In this manner, techniques of the invention described herein beneficially provide a cost-effective solution for migrating subscribers to enhanced features of the broadband service when desired without necessitating the replacement of all STBs in the network or disrupting service to those subscribers who do not opt for such enhanced services.

To accomplish this, embodiments of the invention advantageously move the upstream/downstream split point to a frequency high enough in the spectrum to support a desired upstream data rate of the enhanced broadband service. Upconversion may be used to move the split point to the higher frequency. Subsequently, downconversion is used to restore the analog channels and forward control (DAVIC) carrier to their respective original allocations. Additionally, signals originally generated in a higher frequency band and intended for use by legacy customer premises devices may be downconverted for reception by the legacy devices using the inventive techniques. By way of example only and without loss of generality, in accordance with one embodiment of the invention, the maximum frequency of the upstream frequency range is moved to 200 MHz and the minimum frequency of the downstream frequency range is moved to 258 MHz, thereby establishing a 200/258 MHz split point. This split point provides sufficient spectrum to support an upstream data rate of about 1 Gbps. Other split points supporting higher (or lower) upstream data rates are similarly contemplated by the invention.

Throughout the description herein, it is to be understood that the present invention is not limited to the specific split point of 200/258 MHz, or to any particular split point. Moreover, the principles of the invention are not limited to any specific frequency or frequency band(s) of operation. For example, features of the invention can be used to provide advantages (e.g., enhanced upstream data capability) over conventional approaches using the split point of 85/105 MHz specified in DOCSIS 3.0. Although in using this 85/105 MHz split point analog channels 2 through 6 would be lost, these channels can be restored using techniques of the present invention described herein. Hence, it is to be appreciated that the downconversion bands are essentially flexible according to aspects of the invention.

With reference now to FIG. 3A, a block diagram depicts an exemplary broadband communications system 300, e.g., a cable TV system, according to an embodiment of the invention. It is to be appreciated that references made to specific frequencies and/or frequency ranges (or bands) are presented herein merely by way of illustration only and is not intended to limit the invention in any way. Rather, one skilled in the art given the teachings herein will understand that alternative frequencies and/or frequency ranges may be employed as desired in accordance with other embodiments to accommodate further applications of the inventive techniques.

As apparent from FIG. 3A, system 300 comprises a headend or hub (preferably residing indoors but may alternatively reside outdoors) in communication with CPE 304, which includes one or more legacy devices (e.g., legacy STB) in the home (customer premises), via an HFC network 306, or an alternative networking arrangement. A gateway apparatus (e.g., modem) 308, which preferably resides in the home, is coupled between the CPE 304 and the HFC network 306 and functions, at least in part, as an interface between one or more legacy devices in the home and the HFC network or hub. A more detailed operation of the gateway modem 308 will be described herein below.

A downstream signal path will now be described in accordance with an embodiment of the present invention. As previously stated, in order to achieve a 1 Gbps upstream capacity, the signal frequency spectrum is preferably extended such that a maximum upstream frequency range is increased from 42 MHz to 200 MHz and the minimum downstream frequency range is increased from 54 MHz to 258 MHz, so that the new crossover region lies between 200 MHz and 258 MHz (i.e., 200/258 MHz split point). In this approach, analog channels 2-30 and the forward control (DAVIC) carrier are treated as one large block. The entire spectrum can be moved to the new 200/258 MHz split point using known upconversion techniques (block upconversion). To accomplish this, headend or hub 302 preferably includes an upconverter 310 (e.g., block upconverter (BUC)) operative to receive as an input signals in a 54-258 MHz spectrum and to generate as an output corresponding upconverted signals in a modified 258-454 MHz spectrum. These upconverted signals are then passed to the HFC network 306.

Gateway modem 308 is operative to receive the upconverted signals from the HFC network 306. Specifically, a network interface, which may be a diplex filter 312, in the gateway modem 308 is operative to receive the upconverted signals from the HFC network 306. As noted above, a diplex filter, also referred to as a "diplexer," is generally a passive device adapted to implement frequency domain multiplexing, thereby allowing the forward (e.g., downstream) signal path and the reverse (e.g., upstream) signal path to be conveyed on the same coaxial cable without interference.

More particularly, a diplex filter is a three-port device; two ports are multiplexed onto a third port. Each of the ports is preferably bidirectional. The signals on first and second ports (e.g., ports L and H) occupy disjoint (i.e., non-overlapping) frequency bands. Accordingly, the signals on ports L and H can coexist on the third port (e.g., port S) without interfering with one another. Often, the signals on port L will occupy a lower frequency band and the signals on port H will occupy a higher frequency band. In this scenario, the diplex filter comprises a lowpass filter connecting ports L and S and high pass filter connecting ports H and S. Ideally, all the signal power on port L is transferred to the S port and vice versa. Likewise, ideally all the signal power on port H is transferred to port S and vice versa.

Diplex filter 312 divides forward and reverse signals received from and transmitted to, respectively, the HFC network 306; downstream signals in a frequency range greater than 258 MHz received from the HFC network, coupled to port S of the filter, are sent to port H and upstream signals in a frequency range less than 200 MHz are received on port L of the filter and sent to port S.

Downstream signals on port H of diplex filter 312 are sent to a first radio frequency (RF) splitter 314 which is operative to generate at least two signals having substantially equal amplitudes relative to one another. As will be understood by those skilled in the art, a splitter is essentially a passive device which receives an input signal and generates multiple output signals with specific phase and amplitude characteristics. A zero-degree splitter ideally generates output signals that are of equal amplitude, have zero degrees of phase difference relative to one another and relative to the input signal, and have infinite isolation between the output signals. There is a theoretical insertion loss associated with a splitter. For example, for a splitter having two input ports, a theoretical insertion loss of 3.0 dB is expected between the input signal and either output signal. Moreover, since a splitter is a reciprocal passive device, it may be utilized as a combiner as well simply by applying each signal singularly into each of the splitter output ports. The vector sum of the signals will appear as a single output at the splitter input port. The power combiner will exhibit an insertion loss that varies as a function of the phase and amplitude relationship of the signals being combined.

One of the split signals, S1, generated by first RF splitter 314 is sent to a second RF splitter 316 where signal S1 is split again to generate third and fourth signals, S3 and S4, respectively. Signal S3 is supplied to an advanced DOCSIS receiver 318 (which may be referred to as a "DOCSIS Advanced MAC (media access control) and PHY (physical layer) (A.M.P.)" receiver or, informally, a "DOCSIS 4.0" receiver) which is operative to feed the received downstream signal S3 to a front-end (either digital or analog front end) that selects a desired channel, amplifies it and converts it down to a baseband signal.

Although the type of modulation scheme(s) employed by the DOCSIS A.M.P. receiver 318 is not critical, the receiver is preferably operable using orthogonal frequency division multiplexing (OFDM) or other sub-channelization (i.e., anything that employs multiple carriers) modulation schemes (e.g., QAM or QPSK), in non-limiting embodiments thereof. In one embodiment, DOCSIS A.M.P. receiver 318 may be implemented via a system-on-chip (SOC) manufactured, for example, by Broadcom Corporation, and incorporated into the gateway modem 308. The DOCSIS receiver 318, along with other components, may alternatively be implemented externally to the gateway modem 308, as will be described further in connection with FIG. 3B, according to embodiments of the invention.

Simultaneously (or substantially simultaneously) to signal S3 being presented to receiver 318, signal S4 is supplied to a downconverter 320 (e.g., block downconverter (BDC)), or alternative frequency conversion device, operative to receive, as an input, signals in a 258-454 MHz frequency spectrum and to generate, as an output, corresponding downconverted signals in a 54-258 MHz frequency spectrum. As a result of this downconversion process, downconverter 320 essentially places the upconverted signals supplied to gateway modem 308 back on their original carrier frequency where they are recombined with channels that did not need to be upconverted because they reside normally on a carrier frequency greater than 258 MHz. This recombination is preferably performed by an RF combiner 322 which is operative to receive the downconverted signals generated by downconverter 320 and signal S2 generated by first RF splitter 314 and to generate a combined signal, S5 (e.g., combined programming material).

Optionally, combined signal S5 may be filtered to remove duplicate upconverted content, such as by using a first filter 323 coupled in a series signal path to an output of the RF combiner 322. Alternatively (or in addition to), signal S2 may be optionally filtered, such as, for example, using a second filter 321 coupled in a series signal path between RF splitter 314 and RF combiner 322, to remove the duplicate content prior to being fed to the RF combiner. In accordance with another embodiment, RF splitter 314 may be implemented as a frequency-selective splitter, thereby eliminating the need for additional filters 321 and 323 to remove the duplicate upconverted content.

Combined signal S5 is fed to a second diplex filter 324. Diplex filter 324 includes a first port, port L, for conveying signals in a frequency range less than 42 MHz, a second port, port H, for conveying signals in a frequency range greater than 54 MHz, and a third port, port S, on which the first and second ports are multiplexed. As previously stated, each of the ports of diplex filter 324 is bidirectional. Signal S5, which comprises a combination of the downconverted signals output from downconverter 320 in the frequency range 54-258 MHz, and signal S2, in the frequency range greater than 258 MHz, is supplied to port H of diplex filter 324. These signals are output on port S of diplex filter 324 and are fed to a third diplex filter 326, or alternative CPE interface, operatively coupled to the second diplex filter 324.

Diplex filter 326 includes a first port, port L, for conveying signals in a frequency range less than 1002 MHz, a second port, port H, for conveying signals in a frequency range greater than 1125 MHz, and a third port, port S, on which the first and second ports are multiplexed. Port S of diplex filter 326 is connected to port S of diplex filter 324. In this manner, downstream signals in a frequency range from 54 MHz to 1002 MHz are output on port L of diplex filter 326 and sent to CPE 304. This 54-1002 MHz frequency spectrum continues to support legacy service where 54 MHz is the minimum frequency of the downstream signal path.

Diplex filter 326 additionally functions to separate Multimedia over Coax Alliance (MoCA®, a registered trademark of Multimedia Over Coax Alliance, Inc.) signals received or transmitted by a MoCA transceiver 332 which may be optionally included in gateway modem 308. MoCA transceiver 332 is preferably a bidirectional time division multiple access (TDMA) device used for communicating with other MoCA devices in the home. MoCA provides a specification for transporting digital entertainment and information content over existing coaxial cable in the home in the 1 GHz microwave band, using, for example, orthogonal frequency division multiplexing (OFDM) modulation. (See, e.g., Multimedia over Coax Alliance (MoCA) MAC/PHY v1.1 specification, October 2007, the disclosure of which is incorporated herein by reference in its entirety for all purposes). This cable can be used for providing data connections to televisions, set-top boxes, and other entertainment devices without the need to provide additional or new connections. The technology underlying MoCA provides the elements necessary to use the existing coaxial cable in the home to distribute high-quality multimedia content and high-speed data, with throughput exceeding 100 Mbit/s (Mbps). The MoCA 1.0 and 1.1 specifications currently provide eight 50-MHz wide channels beginning at a frequency of 1125 MHz and ending at 1525 MHz.

Thus, while it is not required to include MoCA transceiver 332 in gateway modem 308, it is preferred in order to facilitate in-home networking between other MoCA-compliant devices in the home and the HFC network 306, particularly where CPE 304 includes MoCA-capable devices. For example, MoCA signals having frequencies greater than 258 MHz from the HFC network 306 are output on port H of diplex filter 312. These signals are split by RF splitter 314, a portion of which is passed through RF combiner 322 and fed to port H of diplex filter 324. The MoCA signals are then fed to diplex filter 326 which separates the MoCA signals having frequencies greater than 1125 MHz from other signals having frequencies less than 1002 MHz. The MoCA signals are output on port H of diplex filter 326 and subsequently sent to MoCA transceiver 332 for further processing.

With continued reference to FIG. 3A, a upstream signal path through the gateway modem 308 will now be described, in accordance with an embodiment of the invention. Signals in the 5-42 MHz frequency band transmitted by one or more legacy devices (e.g., legacy STB or STT) in CPE 304 are received by port L of diplex filter 326, which is operative to receive signals in the frequency range less than 1002 MHz (e.g., 5-42 MHz). The signal received on port L of diplex filter 326 is multiplexed onto port S of diplex filter 326. This signal from CPE 304 (e.g., in the frequency range 5-42 MHz) is then fed to port S of diplex filter 324 which is operative to separate signals having frequencies less than 42 MHz and to output this signal, S6, on port L of diplex filter 324.

Signal S6 output on port L of diplex filter 324 is fed to a RF combiner 328 which is operative to combine signal S6 with an output signal generated by an advanced DOCSIS transmitter 330 (which may be referred to as a "DOCSIS A.M.P." or, informally, a "DOCSIS 4.0" transmitter) to generate a combined signal, S7. Combined signal S7 is supplied to port L of diplex filter 312, which is adapted to receive signals in the frequency range less than 200 MHz, and then multiplexed on port S of diplex filter 312. The combined signal S7 is then sent to HFC network 306 for communication with the headend or hub 302 where the advanced upstream DOCSIS signals in the frequency spectrum less than 200 MHz transmitted by DOCSIS transmitter 330 are routed to an advanced cable modem termination system (CMTS) and the legacy signals in the 5-42 MHz spectrum from CPE 304 are routed to a legacy system for further processing.

Although ideally there are no losses associated with the signal paths in gateway modem 308, in practice one or more components in the gateway modem will exhibit losses, such as, for example, the diplex filters 312, 324 and 326, and the RF splitters/combiners 314, 322 and 328. There may also be losses associated with connection paths in the gateway modem 308, although these losses should not be significant.

As indicated in table 350, RF losses in the signal path between the advanced DOCSIS transmitter 330 and the HFC network 306 (D4 TX signal path) are relatively low; namely, about 4.0 dB. These losses are attributable to the combiner 328 (about 3.5 dB) and one side (e.g., port L to port S) of diplex filter 312 (about 0.5 dB). The overall loss associated with the D4 TX signal path is important since the cost of transmitters capable of providing a 1 Gbps upstream data rate is heavily dependent upon the amount of power required; the amount of transmit power required is, in turn, a direct function of the amount of loss in the signal path. Alternatively, to reduce the loss of the D4 TX signal path even further, combiner 328 may be replaced with a directional coupler which could save about another 2.0 dB. However, a directional coupler is typically more costly than a combiner, and hence the benefit in savings might not be as significant.

Other signal paths in the gateway modem 308 and their associated losses are depicted in table 350. For example, the signal path between the advanced DOCSIS receiver 318 and the HFC network 306 (D4 RX signal path), which is essentially the same as the signal path between the HFC network and the input to the block downconverter 320, has a loss of about 8.0 dB, attributable to one side (e.g., port S to port H) of diplex filter 312 (about 0.5 dB) and RF splitters 314 and 316 (about 3.75 dB each). The legacy transmitter (Legacy TX) exhibits a loss of about 5 dB, not including other in-home signal splitters. This loss is easily tolerated by the legacy transmitter which is designed to tolerate relatively high losses. The legacy receiver (Legacy RX) exhibits a loss of about 7 dB, not including other in-home signal splitters. If required, a conventional in-house amplifier (e.g., about $10-$20), which may already be present, can be used to offset this loss. An embodiment utilizing a stand-alone down-converter integrated with a type-D house amplifier will be described herein below in conjunction with FIG. 4.

With reference to table 352, plant-facing spectrum access corresponding to certain signal paths in the gateway modem 308 is shown. The advanced DOCSIS transmitter signal path D4 TX includes port L of diplex filter 312, and therefore will be limited to upstream signals having frequencies of less than 200 MHz (a corner frequency of the low-pass filter associated with port L of the diplex filter 312). Advantageously, in the future, when legacy upstream support is no longer required, no further modifications to the gateway modem topology according to embodiments of the invention will be needed. The advanced DOCSIS receiver signal path D4 RX includes port H of diplex filter 312, and therefore will support any downstream signals having frequencies of greater than 258 MHz (a corner frequency of the high-pass filter associated with port H of the diplex filter 312).

For legacy support, the legacy transmitter signal path in gateway modem 308, which includes port L of diplex filter 324, is adapted for upstream signals having frequencies of less than 42 MHz (e.g., signals in the range 5-42 MHz). The legacy receiver signal path (which supports access by legacy STB/STTs and legacy DOCSIS devices) is adapted for downstream signals in a first frequency range 54-258 MHz, which includes channels 2-29, A-1:5, and STB OOB communications, and in a second frequency range 462-870 MHz, which includes 15 analog channels (up to 552 MHz) and 53 QAM channels.

The prescribed frequency value of 870 MHz set for the upper limit of the above-noted second frequency range is indicative of the highest QAM channel tunable by 100 percent of the present legacy STBs in a given system, and therefore it would not be useful to provide QAM capability above this frequency. The prescribed frequency value of 462 MHz for the lower limit of the second frequency range is an artifact of the choice of the down-conversion block (e.g., 54-258 MHz) and is a function of the selected block size. The prescribed frequency value of 258 MHz corresponding to the upper limit of the first frequency range associated with the signal block to be up-converted is based on the assumption that it takes about 30 percent of an octave to accomplish a diplex filter operation (e.g., 200 MHz+30% 258 MHz). The gap between the two frequency ranges is a result of the upconversion and downconversion processes associated with the illustrated embodiment (e.g., block upconverter 310 and block downconverter 320). It is to be understood, however, that these prescribed frequencies are merely illustrative and are not limitations of the invention itself.

If, in place of an analog legacy STB, a digital-only STB (which may be referred to herein as a "Baldur" receiver) is used having 1 GHz or higher reception capability (e.g., 1002 MHz), according to another embodiment of the invention, the frequency gap can be reduced by eliminating the need to perform downconversion in the manner described, thereby increasing spectrum access. Digital-only receivers suitable for use with the invention will be well-known by those skilled in the art, and furthermore the type of digital-only receiver employed is not critical to the functioning of the invention. The digital-only receiver signal path (Baldur RX) is adapted for downstream signals in the frequency range 54-258 MHz, which includes up to 33 QAM channels, and 462-1002 MHz, which includes up to 90 QAM channels.

Figure 3B:
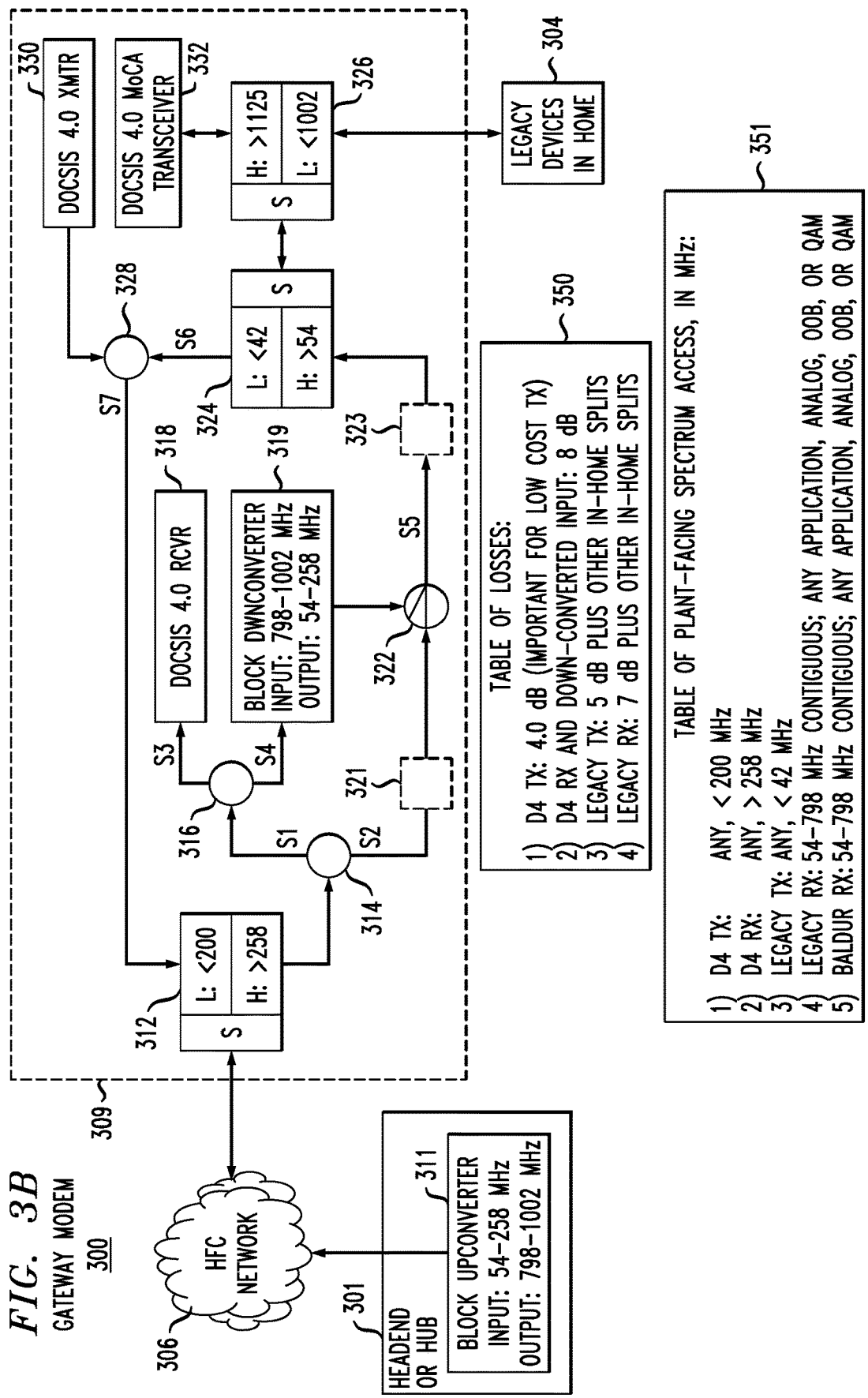
FIG. 3B is a block diagram depicting at least a portion of an exemplary broadband communications system including a gateway apparatus, according to another embodiment of the present invention.

As previously stated, the present invention is not limited to the specific frequency ranges shown in the figures and described herein. By way of illustration only, FIG. 3B is a block diagram depicting at least a portion of an exemplary broadband communications system 300 including a gateway apparatus (e.g., modem) 309, according to another embodiment of the invention. System 300 is essentially the same as the system depicted in FIG. 3A, except that rather than receiving signals from HFC network 306 in a 258-454 MHz spectrum, the gateway modem 309 depicted in FIG. 3B is adapted to receive signals from network 306 in the 798-1002 MHz spectrum. To accomplish this, headend or hub 301 preferably includes an upconverter 311 operative to receive as an input signals in a 54-258 MHz spectrum and to generate as an output corresponding upconverted signals in a modified 798-1002 MHz spectrum. By placing the upconverted signals above the maximum frequency of the former 258-454 MHz spectrum used in gateway modem 308 (FIG. 3A), gaps in the access spectrum can effectively be eliminated, as shown by comparing legacy and digital-only receiver access in table 352 shown in FIG. 3A with corresponding entries in table 351 shown in FIG. 3B. With reference to table 351, the legacy receiver (Legacy RX) and digital-only receiver (Baldur RX) signal paths are adapted for downstream signals in a contiguous frequency range 54-798 MHz for any application, including, for example, analog, out-of-band, or QAM signals.

Similarly, gateway modem 309 is essentially the same as the gateway modem 308 depicted in FIG. 3A, except that the block downconverter 319 in the gateway apparatus is operative to receive, as an input, signals in a 798-1002 MHz frequency spectrum and to generate, as an output, corresponding downconverted signals in a 54-258 MHz frequency spectrum. As a result of this downconversion process, downconverter 319 essentially places the upconverted signals supplied to gateway modem 309 back on their original carrier frequency where they are recombined with channels that did not need to be upconverted because they reside normally on a carrier frequency greater than 258 MHz.

It is to be appreciated that the modified frequency range used in FIG. 3B is also applicable to other embodiments of the invention shown (e.g., illustrative embodiments depicted in FIGS. 3C, 4, 5 and 6) and described herein. Furthermore, in accordance with alternative embodiments of the invention, headend 302 need not convert any signals (or may only convert some of the signals) to a different frequency spectrum. Rather, at least a portion of the signals may be sent to gateway apparatus 309 (via HFC network 306), without performing upconversion at the headend 302, and used at their original frequency locations.

Figure 3C:
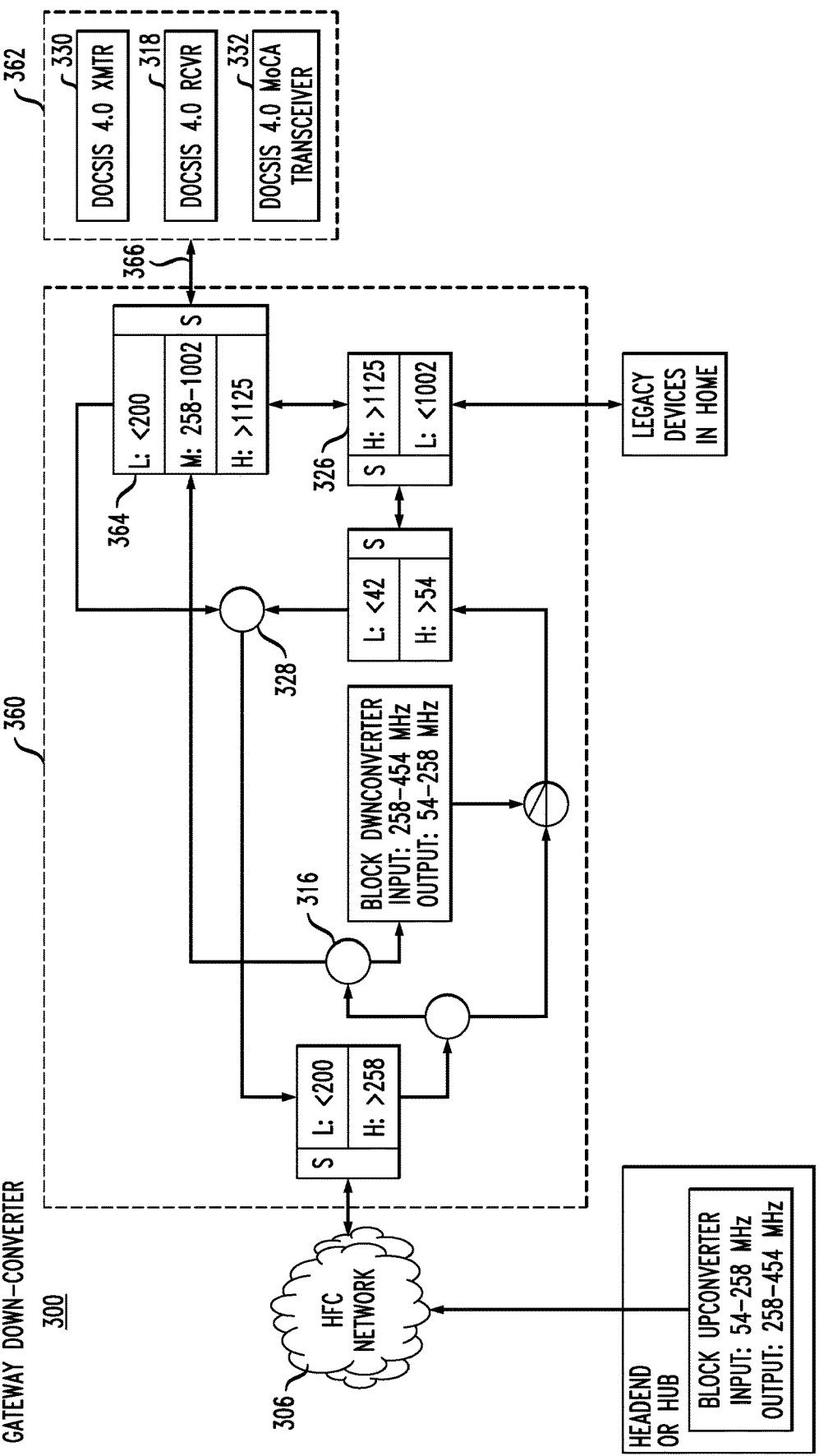
FIG. 3C is a block diagram depicting at least a portion of an exemplary broadband communications system including a simplified gateway apparatus, according to an embodiment of the present invention.

FIG. 3C is a block diagram depicting at least a portion of an illustrative broadband communications system 300 including an exemplary simplified gateway apparatus 360, according to an embodiment of the invention. As previously stated in conjunction with gateway modem 308 shown in FIG. 3A, DOCSIS A.M.P. receiver 318, as well as DOCSIS A.M.P. transmitter 330 and DOCSIS A.M.P. MoCA transceiver 332, may reside externally, such as in a separate block 362 in operative communication with gateway apparatus 360. Thus, gateway apparatus 360 is essentially the same as gateway modem 308, except that the DOCSIS receiver 318, DOCSIS transmitter 330 and DOCSIS MoCA transceiver 332 have been removed therefrom to simplify the gateway implementation.

Since the DOCSIS A.M.P. receiver 318, DOCSIS A.M.P. transmitter 330 and DOCSIS A.M.P. MoCA transceiver 332 all preferably utilize signals in disjoint (i.e., non-overlapping) frequency bands, gateway apparatus 360 includes a triplex filter 364, which may be implemented as cascaded diplex filters, which facilitates communication between the gateway apparatus 360 and block 362 via a single communication link 366. The triplex filter 364 preferably includes a first port, port L, operative with signals having a frequency less than 200 MHz, a second port, port M, operative with signals in a frequency range between 258 MHz and 1002 MHz, a third port, port H, operative with signals having a frequency greater than 1125 MHz, and a fourth port, port S, upon which ports L, M, or H are multiplexed. It is to be appreciated that the frequency ranges described are merely illustrative, and that the invention is not limited to any specific frequency or range of frequencies.

Specifically, signals transmitted by DOCSIS transmitter 330 to gateway apparatus 360 are received on port S of triplex filter 364, via communication link 366, and sent to combiner 328 in gateway apparatus 360 via port L of the triplex filter, and then sent to network 306. Signals from network 306 are split by RF splitter 316 in gateway apparatus 360 are received on port M of triplex filter 364, and then sent to DOCSIS receiver 318. Likewise, signals passed between DOCSIS MoCA transceiver 332 and gateway apparatus 360 are preferably conveyed using ports S and H of the triplex filter 364.

As stated herein above, in order to compensate for losses associated with the legacy receiver signal path, one or more amplifiers can be advantageously employed in the gateway apparatus. FIG. 4 is a block diagram depicting an exemplary broadband communications system 400 including a gateway apparatus 408 comprising a plurality of integrated amplifiers, according to an embodiment of the invention. Like gateway modem 308 shown in FIG. 3A, gateway apparatus 408 is coupled to a headend or hub 302 via a HFC network 306, or alternative communications arrangement (e.g., wide local area network (WLAN)). HFC network 306 is preferably adapted to convey downstream signals (from headend 302 to gateway apparatus 408) in the frequency range 258-1002 MHz and upstream signals (from gateway apparatus 408 to headend) in the frequency range 5-200 MHz. As apparent from the figure, gateway apparatus 408, unlike gate modem 308 shown in FIG. 3A, does not include a DOCSIS transmitter and/or receiver, and may therefore be considered a standalone downconverter. It is reiterated that the invention is not limited to the specific frequencies or range of frequencies described herein.

In order to provide enhanced upstream data rates (e.g., 1 Gbps or higher), the entire spectrum can be moved to the proposed 200/258 MHz split point using known upconversion techniques (block upconversion). To accomplish this, headend or hub 302 preferably includes an upconverter 310 (e.g., block upconverter (BUC)) operative to receive input signals in a 54-258 MHz spectrum and to generate as an output corresponding upconverted signals in a modified 258-454 MHz spectrum, as previously explained. These upconverted signals are then passed to the HFC network 306.

Gateway apparatus 408 is operative to receive the upconverted signals from the HFC network 306. Specifically, a first RF splitter 412 in the gateway apparatus 408 is operative to receive the upconverted signals from the HFC network 306. A first portion of the upconverted signals, S1, output from splitter 412 is fed to a first diplex filter 414 and a second portion of the unconverted signals, S2, may be supplied to an embedded multimedia terminal adapter (eMTA), or other apparatus for delivering broadband services to the home. An eMTA is beneficial for combining delivery of high-speed data with Voice over Internet Protocol (VoIP) services by connecting legacy telephones and terminal equipment (e.g., a facsimile machines) to a multiple system operator's (MSO's) enhanced IP network.

Diplex filter 414 is operative to receive signal S1 from splitter 412 at port S thereof. Since signal S1 has been upconverted and therefore includes components in the 258-454 MHz frequency spectrum, this signal will be multiplexed onto port H of diplex filter 414. As previously described, a diplex filter operatively separates a signal received on its S port into two component portions as a function of frequency; a first portion comprising signals above a first prescribed frequency (e.g., 258 MHz) are output on port H and a second portion comprising signals below a second prescribed frequency (e.g., 200 MHz) are output on port L of the filter.

The downstream signal output on port H of diplex filter 414 is sent to a second RF splitter 416 where the signal is split to generate third and fourth signals, S3 and S4, respectively. Splitter 416 may also be implemented as a directional coupler, according to another embodiment. Signal S3 is supplied to a downconverter 418 (e.g., block downconverter (BDC)) operative to receive as an input signals in a 258-454 MHz spectrum and to generate, as an output, corresponding downconverted signals in a 54-258 MHz spectrum. As a result of this downconversion process, downconverter 418 essentially places the upconverted signals supplied to gateway apparatus 408 back on their original carrier frequency where they are recombined with channels that did not need to be upconverted because they originally reside on a carrier frequency greater than 258 MHz. This recombination is preferably performed by an RF combiner 419 which is operative to receive the downconverted signals generated by downconverter 418 and signal S4 generated by second RF splitter 416 and to generate a combined signal, S5. Optionally, combined signal S5 may be filtered to remove duplicate upconverted material.

Combined signal S5 is fed to a first amplifier 420, which may be a type-D house amplifier or the like. Amplifier 420 is preferably configured having a gain that at least compensates for losses in the downstream signal path attributable to, for example, block upconversion/downconversion (e.g., block upconverter 310, block downconverter 418), diplex filter 414, and splitters 412 and 416. The gain of amplifier 420 may also compensate for losses associated with splitters 426, 428 and 430, generally about 4 dB per split. For example, a 4-way signal split (as shown) would typically exhibit a loss of about 8 dB in each signal path. The gain of amplifier 420 may be programmable in other embodiments to account for variability in the downstream signal path. While only one amplifier 420 is shown, it is to be understood that more than one amplifier circuit may be used (e.g., cascaded in series), with the gain of each amplifier adjusted accordingly to provide a prescribed overall gain in the signal path.

With regard to losses in general, a determination of losses in the system is beneficial in that losses in front of a gain block (e.g., amplifiers 420 and 432) generally worsen overall noise performance in the system. It is therefore desirable to minimize losses in a given signal path prior to the gain block.

The amplified signal generated by amplifier 420 is fed to port H of a second diplex filter 422 adapted for receiving signals in a frequency range greater than 54 MHz. This signal is output on port S of diplex filter 422 and then supplied to a low-pass filter (LPF) 424. LPF 424 is configured having a corner frequency of 1002 MHz, and is therefore operative to pass frequencies below 1002 MHz and to attenuate signal components above 1002 MHz. LPF 424 is operative to minimize MoCA energy on the cable TV feeder and to prevent interference between homes that use MoCA technology. LPF 424 also acts as a reflector to minimize loss of the MoCA signal within the home. The filter signal generated by LPF 424 is preferably split using one or more RF splitters 426, 428 and 430, and supplied to CPE, including STBs and TV outlets.

For the upstream signal path, a signal from one or more STBs in the home is supplied to the one or more splitters 426, 428 and 430, and passed through LPF 424 to remove, or substantially attenuate, signal components greater than 1002 MHz (e.g., noise, etc.). The filtered upstream signal is then fed to port S of diplex filter 422. Since upstream signals occupy the frequency spectrum less than 42 MHz, this signal is sent to port L of diplex filter 422. This signal output on port L is then amplified by a second amplifier 432, which again may be a type-D house amplifier or an alternative amplifier. The amplified signal generated by amplifier 432 is sent to port L of diplex filter 414 where it is multiplexed onto port S of filter 414 and subsequently passed, through splitter 412, to HFC network 306.

Amplifier 432 is preferably configured having a gain that at least compensates for losses in the upstream signal path attributable to, for example, RF splitters 426, 428 and 430 and diplex filter 422, as well as other losses that may be present in the upstream signal path (e.g., diplex filter 414 and splitter 412). The gain of amplifier 432 may be programmable in other embodiments to account for variability in the upstream signal path. As in the case with amplifier 420, while only one amplifier 432 is shown, it is to be understood that more than one amplifier circuit may be used (e.g., cascaded in series), with the gain of each amplifier adjusted accordingly to provide a prescribed overall gain in the signal path. By controlling the amounts of gain in amplifiers 420 and 432, the split ratios of splitters 412, 416, 419, 426, 428 and 430 can be beneficially configured as desired.

In table 450, RF losses in the respective signal paths between each port (except the eMTA port) and the HFC network 306 are indicated. These losses are attributable to components in the signal paths, including, for example, the splitters 416, 426, 428 and 430, diplex filters 414 and 422, LPF 424, and combiner 412. The overall loss associated with the legacy transmitter signal path (Legacy TX) for upstream signals is about a uniform 6 dB, and for downstream signals in the legacy receiver signal path (Legacy RX) there is a uniform gain (for about 75 feet of RG-6 coaxial cable.

With reference to table 452, plant-facing spectrum access corresponding to certain signal paths in the gateway apparatus 408 is shown. The legacy transmitter signal path (Legacy TX) in gateway apparatus 408, which includes port L of diplex filters 414 and 422, is adapted for upstream signals having frequencies of less than 42 MHz (e.g., signals in the range 5-42 MHz). The legacy receiver signal path (Legacy RX) is adapted for downstream signals in the frequency range 54-258 MHz, which includes channels 2-29, A-1:5, and STB OOB communications, and 462-870 MHz, which includes 15 analog channels (up to 552 MHz) and 53 QAM channels. The gap between the two frequency ranges is a result of the upconversion and downconversion processes associated with the illustrated embodiment (e.g., block upconverter 310 and block downconverter 418). If, in place of an analog legacy STB, a digital-only STB (e.g., Baldur receiver) is used having 1002 MHz reception capability, according to another embodiment of the invention, the frequency gap can be reduced by eliminating the need to perform downconversion in the manner described, thereby increasing spectrum access. The Baldur receiver signal path (Baldur RX) is adapted for downstream signals in the frequency range 54-258 MHz, which includes up to 33 QAM channels, and 462-1002 MHz, which includes up to 90 QAM channels.

As stated above, the eMTA port coupled to splitter 412 is preferably an exception to the losses set forth in tables 450 and 452 corresponding to the gateway apparatus 408. Specifically, the eMTA port is purposefully located such that in the event of a power failure or other scenario in which the gain blocks (e.g., amplifiers 420 and 432) in gateway apparatus 408 stopped functioning, the eMTA port essentially avoids the losses attributable to the various splitters, etc., in the gateway apparatus, thereby allowing a telephone or other device coupled to network 306 via the eMTA port to continue functioning, assuming the device had its own local power source (e.g., battery backup). Thus, the eMTA port advantageously does not require operation of the gain blocks in the gateway apparatus 408.

FIG. 5 is a block diagram depicting an exemplary broadband communications system 500 including an illustrative gateway apparatus 508, according to an embodiment of the present invention. Gateway apparatus 508 is suitable for use, for example, in homes that do not employ advanced media access control (MAC) and physical (PHY) layer DOCSIS devices, only legacy CPE 304 (e.g., legacy STBs or STTs). This embodiment is essentially a simplified version of gateway apparatus 408 shown in FIG. 4. As in the other embodiments described herein above, it is to be appreciated that the invention is not limited to the specific frequencies or range of frequencies shown.

As apparent from FIG. 5, gateway apparatus 508 is coupled to HFC network 306 and is operative as an interface between the HFC network and CPE 304, which preferably includes one or more legacy devices in the home. HFC network 306, in turn, is in communication with headend 302 and is adapted to receive downstream signals therefrom that have been upconverted, by upconverter 310 or alternative upconversion means, from a 54-258 MHZ frequency spectrum to a 258-454 MHz frequency spectrum, as previously explained.

Gateway apparatus 508 is operative to receive the upconverted signals from the HFC network 306. More particularly, a first diplex filter 512 in gateway apparatus 508 is operative to receive the upconverted signals from the HFC network 306. Diplex filter 512 includes a first port, port L, for conveying signals in a frequency range less than 42 MHz, a second port, port H, for conveying signals in a frequency range greater than 258 MHz, and a third port, port S, on which the first and second ports are multiplexed. Diplex filter 512 is operative to divide forward and reverse signals received from and transmitted to, respectively, HFC network 306; downstream signals in a frequency range greater than 258 MHz received from the HFC network, coupled to port S of the filter, are sent to port H and upstream signals in a frequency range less than 200 MHz are received on port L of the filter and multiplexed onto port S for transmission to the HFC network.

Downstream signals output on port H of diplex filter 512 are fed to a RF splitter 514 which is operative to generate at least two signals having substantially equal amplitudes and phase relative to one another. One of the split signals, S 1, generated by RF splitter 514 is supplied to a downconverter 516 (e.g., a block downconverter) operative to receive, as an input, signals in a 258-454 MHz frequency spectrum and to generate, using known downconversion techniques, corresponding downconverted signals in a 54-258 MHz frequency spectrum. As a result of the downconversion process, downconverter 516 essentially places the upconverted signals supplied to gateway apparatus 508 back onto their original carrier frequency where they are recombined with another split signal, S2, generated by RF splitter 514. Signal S2 may include channels that originally reside on a carrier frequency greater than 258 MHz and therefore do not require upconversion; in this instance, downconversion of these channels (such as by downconverter 516) to their original carrier frequencies can be omitted (bypassed). The recombination of signal S2 with the downconverted signal is preferably carried out using an RF combiner 518, or alternative combination means, operative to receive the downconverted signals, generated by downconverter 516, and signal S2, generated by RF splitter 514, and to generate a combined signal, S3. Optionally, signal S3 may be filtered to remove duplicate upconverted material.

Combined signal S3 is fed to a second diplex filter 520. Diplex filter 520 includes a first port, port L, for conveying signals in a frequency range less than 42 MHz, a second port, port H, for conveying signals in a frequency range greater than 54 MHz, and a third port, port S, on which the first and second ports are multiplexed. As previously stated, each of the ports of diplex filter 520 is bidirectional. Signal S3, which comprises a combination of the downconverted signals output from downconverter 516 in the frequency range 54-258 MHz, and signal S2, in the frequency range greater than 258 MHz, is supplied to port H of diplex filter 520. These signals are output on port S of diplex filter 520 which is coupled to legacy devices in CPE 304 (e.g., legacy STB).

Upstream signals from CPE 304 are, similarly, sent to port S of diplex filter 520 where, being in a 5-42 MHz frequency spectrum, are output on port L of filter 520. These signals are then supplied to port L of diplex filter 512 where they are passed to HFC network 306. As apparent from FIG. 5, upstream signals do not pass through a splitter. Consequently, overall losses associated with the upstream signal path in gateway apparatus 508 are less compared to the gateway modem 308 shown in FIG. 3A. For example, as indicated in table 550, overall losses corresponding to the legacy transmitter signal path (Legacy TX) in gateway apparatus 508 are about 1 dB (plus other in-home splits) compared to about 5 dB for the legacy transmitter signal path in gateway modem 308. Losses corresponding to the legacy receiver signal path (Legacy RX) in gateway apparatus 508 are essentially the same as the losses for the legacy receiver signal path in gateway modem 308; namely, about 7 dB.

With regard to spectrum access of the signal paths in gateway apparatus 508, plant-facing spectrum access for gateway apparatus 508, as indicated in table 552, is essentially the same as for the gateway apparatus 408 shown in FIG. 4. Specifically, the legacy transmitter signal path in gateway apparatus 508, which includes port L of diplex filters 512 and 520, is adapted for upstream signals having frequencies of less than 42 MHz (e.g., signals in the frequency range 5-42 MHz). The legacy receiver signal path is adapted for downstream signals in the frequency range 54-258 MHz, which includes channels 2-29, A-1:5, and STB OOB communications, and 462-870 MHz, which includes 15 analog channels (up to 552 MHz) and 53 QAM channels. As previously explained, the gap between the two frequency ranges is primarily a result of the upconversion and downconversion processes associated with the illustrated embodiment (e.g., block upconverter 310 and block downconverter 516). If, in place of an analog legacy STB, a digital-only STB (e.g. "Baldur" receiver) is employed, according to another embodiment of the invention, the frequency gap can be reduced by eliminating the need to perform downconversion in the manner described, thereby increasing spectrum access. The Baldur receiver signal path (Baldur RX) is adapted for conveying downstream signals in the frequency range 54-258 MHz (up to 33 QAM channels) and 462-1002 MHz (up to 90 QAM channels).

In the various illustrated embodiments of the invention described herein, the gateway apparatus (e.g., 308, 408, 508) is shown as a separate functional block from the CPE 304. It is to be appreciated, however, that the gateway apparatus, or portions thereof, may be incorporated within CPE 304 (e.g., within a STB). Additionally, one or more functional blocks shown in the illustrated embodiments of FIGS. 3-5 may be combined into one another or into a different functional block; the depictions herein are not intended to limit the actual physical implementation of the apparatus in any way. For example, diplex filters 324 and 326 in the gateway modem 308 shown in FIG. 3A may be advantageously combined into one four-port filter (e.g., quadruplex filter or "quadruplexer"). Likewise, RF splitters 314 and 316 may be combined into a single three-way splitter, as will become apparent to those skilled in the art given the teachings herein.

Techniques of the invention described herein may be performed using hardware and/or software aspects. Software includes, but is not limited to, firmware, resident software, microcode, etc. By way of illustration only, according to an embodiment of the invention at least a portion of the receiver in gateway modem 308 may be implemented using a broadband digital direct downconversion receiver suitable for software-defined radio. (See, e.g., Mohamed Ratni et al., "Broadband Digital Direct Down Conversion Receiver Suitable for Software Defined Radio," 13th IEEE Int. Symposium on Personal, Indoor and Mobile Radio Communications PIMRC, Lisbon, Portugal, September 2002, pp. 93-99, the disclosure of which is incorporated herein by reference in its entirety for all purposes). For example, signals (e.g., from HFC network 306) can be received using any band, or they can be received in QAM and then using software techniques the corresponding analog versions can be synthesized therefrom.

One or more embodiments of the invention or elements thereof may be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 6:
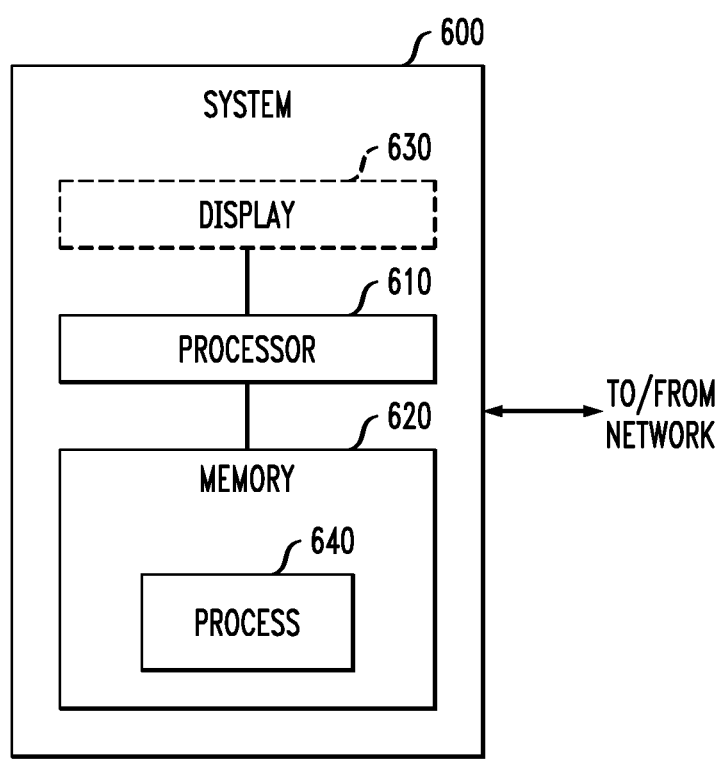
FIG. 6 is a block diagram depicting an exemplary processing system, according to an embodiment of the present invention.

Aspects of the invention may be particularly well-suited for use in an electronic device or alternative system (e.g., broadband communications system). For example, FIG. 6 is a block diagram depicting an exemplary processing system 600 formed in accordance with an aspect of the invention. System 600, which may represent, for example, a gateway apparatus or a portion thereof, may include a processor 610, memory 620 coupled to the processor (e.g., via a bus or alternative connection means), as well as input/output (I/O) circuitry, of which display 630 is representative, operative to interface with the processor. The processor 610 may be configured to perform at least a portion of the functions of the present invention (e.g., by way of one or more processes 640 which may be stored in memory 620), illustrative embodiments of which are shown in the previous figures and described herein above.

It is to be appreciated that the term "processor" as used herein is intended to include any processing device, such as, for example, one that includes a central processing unit (CPU) and/or other processing circuitry (e.g., network processor, digital signal processor (DSP), microprocessor, etc.). Additionally, it is to be understood that a processor may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., display, etc.) for presenting the results associated with the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in the previous figures may be implemented in various forms of hardware, software, or combinations thereof (e.g., one or more DSPs with associated memory, application-specific integrated circuit(s), functional circuitry, one or more operatively programmed general purpose digital computers with associated memory, etc.). Given the teachings of the invention provided herein, one of ordinary skill in the art will be able to contemplate other implementations of the components of the invention.

At least a portion of the illustrative techniques of the present invention may be implemented in an integrated circuit. In forming integrated circuits, die are typically fabricated in a repeated pattern on a surface of a semiconductor wafer. Each of the die includes a device described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of operating a gateway modem for providing a legacy service to a legacy device, the method comprising the steps of:
receiving from a communications network a first signal in a first frequency band, the first signal providing an enhanced broadband service over the communications network using a crossover point sufficiently high that a legacy device is unable to receive a forward control carrier contained in the first signal;
downcoverting the first signal from the first frequency band to a translated first signal in a second frequency band, the first and second frequency bands being non-overlapping;
combining the translated first signal in the second frequency band with the first signal in the first frequency band to generate combined programming material comprising the first signal in the first frequency band and the translated first signal in the second frequency band for transmission to a legacy device, wherein the first signal in the second frequency band comprises the forward control carrier and is configured for reception by the legacy device;

receiving from the legacy device a second signal comprising upstream data in a third frequency band for transmission to the communications network, the first, second and third frequency bands being non-overlapping;

combining the second signal with a third signal in a fourth frequency band overlapping the second frequency band; and transmitting to the communications network a combined signal comprising the second signal in the third frequency band and the third signal in the fourth frequency band.

2. The method of claim 1, wherein the third frequency band has a maximum frequency which is less than a minimum frequency of the first frequency band.

3. The method of claim 1, wherein a minimum frequency of the fourth frequency band being greater than a maximum frequency of the third frequency band.

4. The method of claim 3, wherein the third signal adapted to communicate using a Multimedia over Coax Alliance (MoCA) communications protocol.

5. The method of claim 1, wherein the third signal in the fourth frequency band is configured for providing enhanced upstream broadband data communications capability to a subscriber of the communications network.

6. The method of claim 1, wherein the steps of downcoverting the first signal from the first frequency band and combining the translated first signal in the second frequency band with the first signal in the first frequency band comprises:

splitting the first signal from the first frequency band to generate at least first and second split signals, each of the first and second split signals having substantially equal amplitudes and phases relative to one another;

downconverting the first split signals in the first frequency band to the second frequency band to generate downconverted signals, wherein the downconverted signals are the translated first signal, and wherein the second split signals duplicate the content of the first signal in the first frequency band; and combining the downconverted signals with the second split signals to generate the combined programming material.

7. The method of claim 1, further comprising filtering the combined programming material to remove duplicate content, including the forward control carrier including at least one out-of-band channel, from the first signal in the first frequency band of the combined programming material.

8. The method of claim 1, further comprising filtering the first signal in the first frequency band to remove duplicate content, including the forward control carrier including at least one out-of-band channel, from the first signal in the first frequency band prior to generating the combined programming material.

9. The method of claim 1, further comprising multiplexing the first signal in the first frequency band and a second signal in a third frequency band received from the receiving location equipment to generate a multiplexed signal, the first and third frequency bands being non-overlapping, the multiplexed signal comprising at least one of the first signals and the third signals received from or transmitted to, respectively, the communications network.

10. The method of claim 1, further comprising amplifying the combined programming material to generate an amplified signal having a gain which is adapted to at least partially compensate for one or more losses in a signal path between the communications network and the receiving location equipment.

11. The method of claim 1, wherein the second frequency band has a maximum frequency that is less than a minimum frequency of the first frequency band.

12. The method of claim 1, wherein the step of translating the first signal from the first frequency band to the second frequency band is operative to restore a location of one or more analog channels received from the communications network to an original prescribed location of the analog channels.

13. A method of operating a gateway modem for providing a legacy service to a legacy device, the method comprising the steps of:

receiving from a communications network a first signal in a first frequency band, the first signal providing an enhanced broadband service over the communications network using a crossover point sufficiently high that a legacy device is unable to receive a forward control carrier contained in the first signal;

downcoverting the first signal from the first frequency band to a translated first signal in a second frequency band, the first and second frequency bands being non-overlapping; and combining the translated first signal in the second frequency band with the first signal in the first frequency band to generate combined programming material comprising the first signal in the first frequency band and the translated first signal in the second frequency band for transmission to a legacy device, wherein the first signal in the second frequency band comprises the forward control carrier and is configured for reception by the legacy device, wherein the crossover point corresponding to the first frequency band is between about 200 megahertz (MHz) and about 258 MHz and a crossover point corresponding to the second frequency band is between about 40 MHz and 54 MHz.

14. The method of claim 1, further comprising transmitting the combined programming material comprising the first signal in the first frequency band and the translated first signal in the second frequency band to a device consuming the first signal in the first frequency band.

15. A method of operating a gateway modem for providing a legacy service to a legacy device, the method comprising the steps of:

receiving from a communications network a first signal in a first frequency band, the first signal providing an enhanced broadband service over the communications network using a crossover point sufficiently high that a legacy device is unable to receive a forward control carrier contained in the first signal;

downcoverting the first signal from the first frequency band to a translated first signal in a second frequency band, the first and second frequency bands being non-overlapping;

combining the translated first signal in the second frequency band with the first signal in the first frequency band to generate combined programming material comprising the first signal in the first frequency band and the translated first signal in the second frequency band for transmission to a legacy device, wherein the first signal in the second frequency band comprises the forward control carrier and is configured for reception by the legacy device;

receiving from the legacy device a second signal comprising upstream data in a third frequency band for transmission to the communications network, the first, second and third frequency bands being non-overlapping;

combining the second signal with a third signal comprising upstream data in a fourth frequency band overlapping said second frequency band; and transmitting a combined signal comprising the second signal in the third frequency band and a third signal in the fourth frequency band to the communications network.

* * * * *